United States Patent
Prasad et al.

(10) Patent No.: US 11,917,031 B2
(45) Date of Patent: Feb. 27, 2024

(54) MESSAGE BROKER RESOURCE DELETION

(71) Applicant: Dell Products L.P., Round Rock, TX (US)

(72) Inventors: Parmeshwr Prasad, Bangalore (IN); Rahul Deo Vishwakarma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 17/581,369

(22) Filed: Jan. 21, 2022

(65) Prior Publication Data

US 2023/0239370 A1    Jul. 27, 2023

(51) Int. Cl.
| | |
|---|---|
| *H04L 41/0604* | (2022.01) |
| *H04L 67/60* | (2022.01) |
| *H04L 67/562* | (2022.01) |
| *H04L 67/51* | (2022.01) |

(52) U.S. Cl.
CPC ........ *H04L 67/562* (2022.05); *H04L 41/0622* (2013.01); *H04L 67/51* (2022.05); *H04L 67/60* (2022.05)

(58) Field of Classification Search
None
See application file for complete search history.

(56) References Cited

U.S. PATENT DOCUMENTS

| | | | |
|---|---|---|---|
| 6,272,539 B1 * | 8/2001 | Cuomo | H04L 43/0864 713/502 |
| 9,747,057 B1 * | 8/2017 | Ramani | G06F 3/067 |
| 9,864,691 B1 * | 1/2018 | Chen | G06F 3/0607 |
| 11,122,000 B1 * | 9/2021 | Saalfeld | H04L 12/185 |
| 11,228,656 B1 * | 1/2022 | Celestine | G06F 9/542 |

(Continued)

FOREIGN PATENT DOCUMENTS

| | | | | |
|---|---|---|---|---|
| EP | 0280020 A2 * | 1/1988 | | G06F 11/328 |
| EP | 2528339 A2 * | 11/2012 | | H04N 21/42204 |
| WO | WO-2023048609 A1 * | 3/2023 | | |

OTHER PUBLICATIONS

Jia et al. (CN 113094235 A) 'Coud audit system tail delay abnormal indicate data belong service input multi class machine learning model after integrate complete', Source: Derwent Database (Year: 2021).*

*Primary Examiner* — Dhairya A Patel
*Assistant Examiner* — Sandarva Khanal
(74) *Attorney, Agent, or Firm* — Amin, Turocy & Watson, LLP

(57) ABSTRACT

A message broker resource monitoring service obtains message broker resource parameter data of a resource, based on communications of a message broker. Based on the resource parameter data and historical data, the message broker resource monitoring service obtains a predicted message delivery time value, which can be in association with confidence. If the predicted message delivery time value satisfies a resource deletion criterion, e.g., the predicted message delivery time value, with sufficient confidence, exceeds a threshold value, the message broker resource monitoring service triggers an action to delete the resource. To obtain the predicted value, a regression such as symmetric conformal quantile regression can be applied to the parameter data, e.g., to obtain a predicted message delivery time/latency value.

20 Claims, 10 Drawing Sheets

(56) References Cited

U.S. PATENT DOCUMENTS

| | | | |
|---|---|---|---|
| 2004/0073692 A1* | 4/2004 | Gentle | H04L 47/12 709/231 |
| 2004/0093415 A1* | 5/2004 | Thomas | H04L 67/1001 709/227 |
| 2005/0088976 A1* | 4/2005 | Chafle | H04L 67/1012 370/252 |
| 2006/0041698 A1* | 2/2006 | Han | H04L 12/6418 710/106 |
| 2006/0088003 A1* | 4/2006 | Harris | H04W 76/38 370/433 |
| 2007/0083648 A1* | 4/2007 | Addleman | H04L 43/00 709/224 |
| 2008/0133646 A1* | 6/2008 | Azulai | G06F 9/541 709/202 |
| 2015/0195171 A1* | 7/2015 | Mermoud | H04L 43/106 370/253 |
| 2015/0264067 A1* | 9/2015 | Kim | H04L 63/20 726/23 |
| 2017/0011327 A1* | 1/2017 | Mantri | G06Q 10/063114 |
| 2017/0034253 A1* | 2/2017 | Jiang | H04W 12/082 |
| 2017/0187785 A1* | 6/2017 | Johnson | H04L 51/42 |
| 2017/0206462 A1* | 7/2017 | Arndt | G06F 11/3433 |
| 2017/0262804 A1* | 9/2017 | Shroff | G06N 7/01 |
| 2019/0171451 A1* | 6/2019 | Hardy | G06F 11/3433 |
| 2019/0197148 A1* | 6/2019 | Engstrand | G06F 16/2365 |
| 2019/0312947 A1* | 10/2019 | Brown | G06F 11/0709 |
| 2019/0325353 A1* | 10/2019 | Aftab | G06F 8/30 |
| 2019/0386924 A1* | 12/2019 | Srinivasan | H04L 47/122 |
| 2022/0050614 A1* | 2/2022 | Vishwakarma | G06F 11/3006 |
| 2022/0108147 A1* | 4/2022 | Wan | H04L 67/51 |

\* cited by examiner

MESSAGE BROKER RESOURCE DELETION

BACKGROUND

Monolithic application programs are being separated into microservices, including for purposes of scalability, team autonomy and development. Each microservice has its own data model and manages its own data, whereby if a specific microservice fails, that failure can be isolated to that single service, which prevents cascading failures. This fault isolation also helps the application program remain running when one of its modules fails.

Data often moves between microservices via a message broker. A message broker is a defined and independent program module that routes messages between services (including microservices) and application programs so that different services and applications can communicate with each other. In addition to message routing, a message broker can validate messages and transform messages as needed.

A message broker thus uses a number of computing resources that are supposed to be deleted (cleaned) when no longer needed. By way of example, consider a queue used by a message broker. In general, with some workloads, such queues are supposed to be short lived. However, queues are not always cleaned when they should be, and there are some types of queues (e.g., those without consumers such as when consumption happens by "pulls" using the get method, those that are durable, false for auto-delete when unused, non-exclusive and waiting and so on) that are not automatically deleted. As another example, while before disconnection clients of a message broker can delete declared queues, this is not always done. Further, client connections can fail, potentially leaving unused queues (and other resources) undeleted, which causes a number of problems. Also when a service dies, its associated queue will not be cleaned, and moreover, some services do not properly delete queues when finished.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards deleting (i.e. cleaning) a message broker's dangling resources, such a message broker queue that is no longer being used and should have been deleted. A message broker monitoring service obtains different parameters from a message broker, and runs a prediction model to obtain a predicted (e.g., estimated message delivery time/latency) value indicative of whether a resource is a dangling resources that can be deleted. If so, the message broker monitoring service triggering an appropriate deletion-related action.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
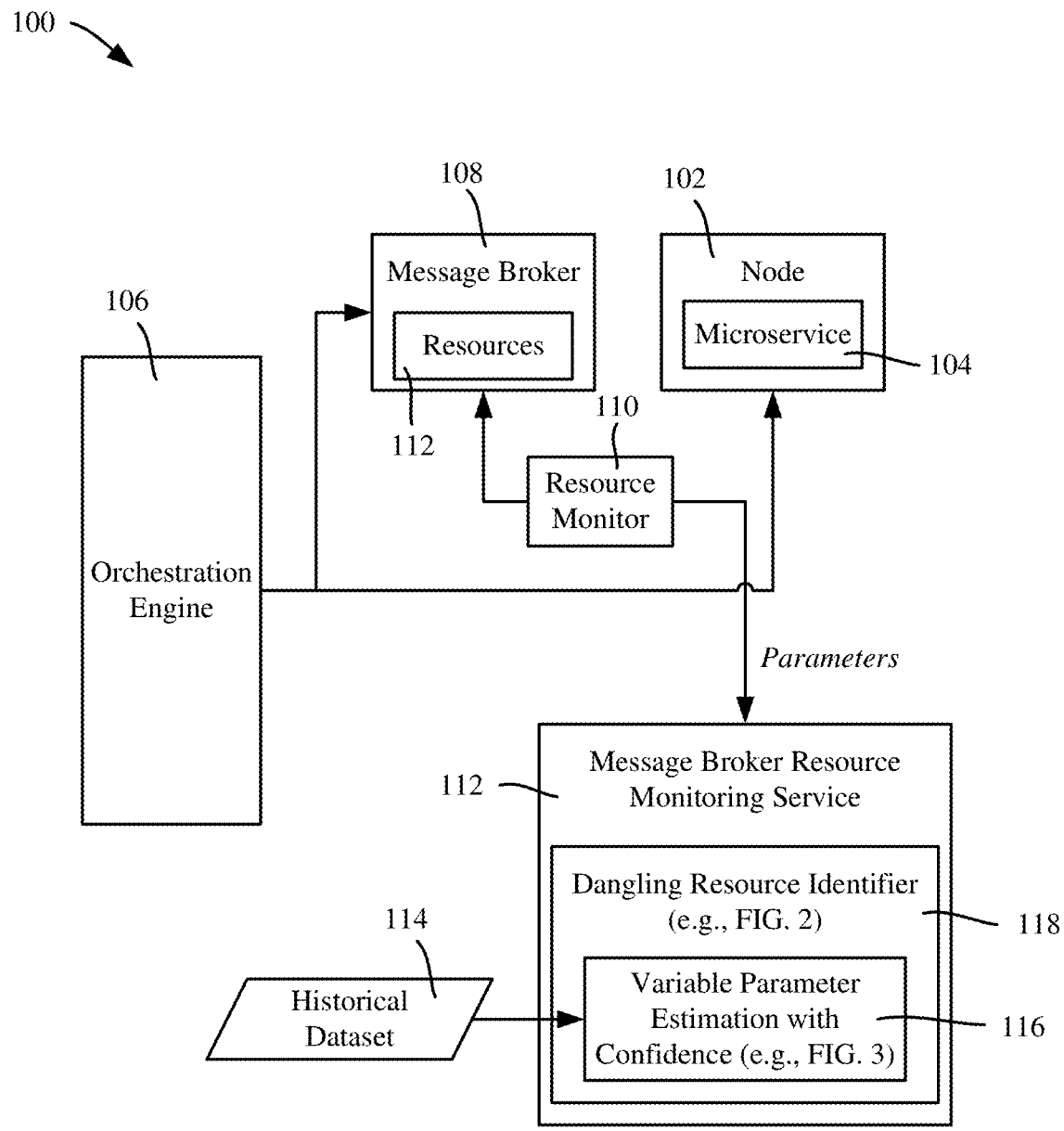
FIG. 1 is an example block diagram representation of integrating a message broker resource monitoring service into a system of components to detect inappropriately undeleted "dangling" resources that need to be deleted, in accordance with various aspects and implementations of the subject disclosure.

FIG. 1 shows example system 100 of various elements and interfaces, including a node 102 on which a microservice 104 is running. An orchestration engine 106 couples the node 102 and the microservice 104 to a message broker 108, although it is understood that the component arrangement of FIG. 1 is only one example, and a more direct coupling between the node 102/microservice 104 to a message broker 108 is possible, and that a different component or components may couple the node 102/microservice 104 to the message broker 108.

A resource monitor 110 monitors the usage of resources 112 of the message broker 108 to obtain various parameter values as described herein. There can be a resource monitor per resource used by the message broker, such as a resource monitor for a queue, one for socket(s), one for memory space, one for a file handler, one for disk space, one for an open connection, one for a channel, or the like. Alternatively, a resource monitor can monitor the parameters of multiple resources used by the message broker.

The resource monitor 110 is coupled to a message broker resource monitoring service 112 that, as described herein, determines whether a message broker resource such as a queue should be deleted, e.g., a "dangling" queue is detected, based on the various parameters collected by the resource broker 110. In general, the message broker resource monitoring service 112 is a helper service, and can abstract broker-specific changes. Note that in one implementation, the message broker resource monitoring service 112 sends heartbeats to the message broker 108 for connection confirmation. There can be one message broker resource monitoring service 112 per message broker, or a message broker resource monitoring service can operate with respect to multiple message brokers.

The message broker resource monitoring service 112 acts as an intelligent resource monitoring and replacement service between a message broker and other microservices. As described herein, message broker resource monitoring service 112 (via the resource monitor) collects multiple parameters from a message broker coupled thereto, e.g., the message broker 108 of FIG. 1. Collected parameters can include, but are not limited to, number of Measure nodes, message rates, Publisher Confirmations, acknowledgement (ACK) latency, order of publisher confirmations, and a "reaching to maximum delivery tag" which corresponds to message delivery time/latency. As described herein, given the collected parameters and a historical dataset 114 of previously collected like parameter values, the message delivery time/latency value (along with confidence data) can be estimated by a variable parameter estimation with confidence component 116, and in turn used by a dangling resource identifier component 118 to identify whether a resource used by the message broker 108 is a dangling resource. If so, action can be taken/triggered to delete the resource as described herein. Note that although in the example of FIG. 1 the components 116 and 118 are shown as incorporated into the message broker resource monitoring service 112, it is understood that either or both example components can instead be coupled to the message broker resource monitoring service 112 and/or to each other in other ways.

Figure 2:
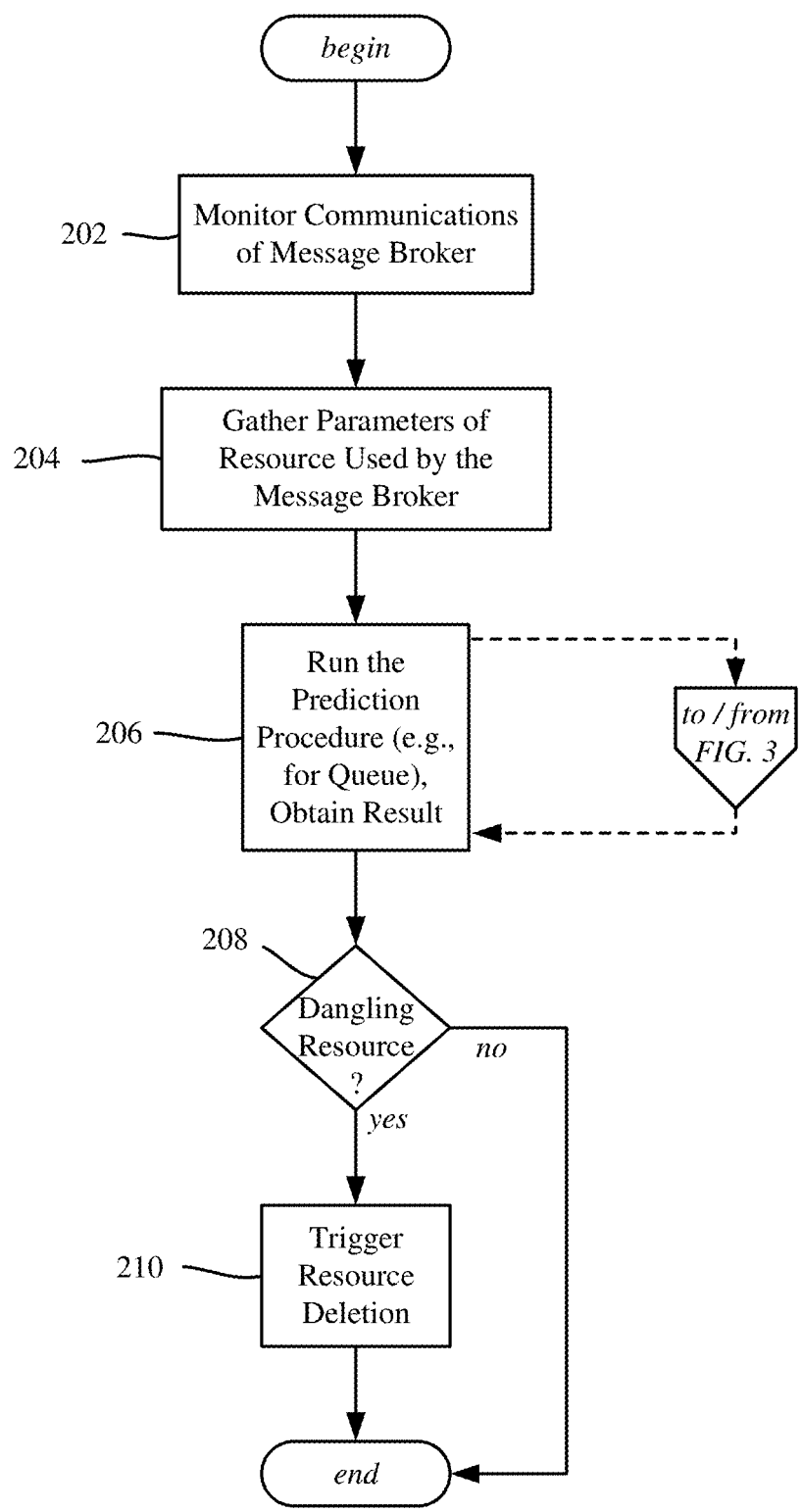
FIGS. 2 and 3 comprise an example flow diagram representing example operations of a dangling resource identifier that predicts a delivery tag estimation with confidence value, in accordance with various aspects and implementations of the subject disclosure.
Figure 3:
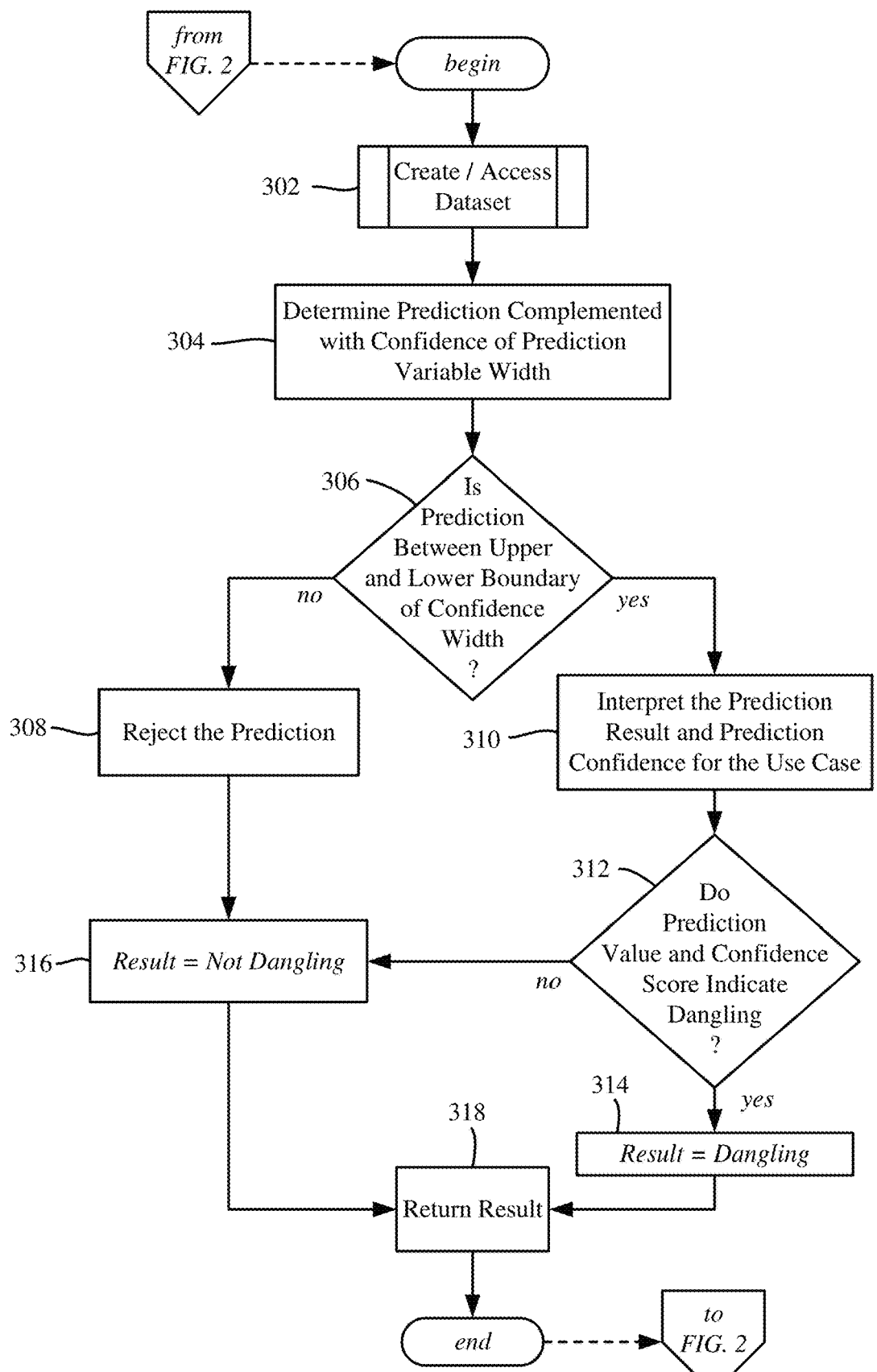

FIGS. 2 and 3 comprise a flow diagram representing example operations of the various components related to detection of a dangling resource. In general FIG. 2 represents example operations of the dangling resource identifier component 118, while FIG. 3 represents example operations of the variable parameter estimation with confidence component 116 of FIG. 1; however as will be understood, the example operations performed by each component are somewhat arbitrarily separated.

Example operations 202 and 204 of FIG. 2 represent monitoring the communications of a message broker to gather the parameters of a resource used by the message broker. Based on the gathered resources, example operation 206, corresponding to FIG. 3, runs the prediction procedure (e.g., for the resources of a queue) to obtain a result.

More particularly, example operation 302 of FIG. 3 creates (if not already created) and accesses dataset of the parameters. Based on these parameter values, example operation 304 determines a prediction (estimated value) complemented with a confidence based on the prediction variable width, as described herein. The predicted value corresponds to a message delivery time/latency estimated from the other parameters, alternatively referred to as the "reaching to maximum delivery tag" value.

Example operation 306 evaluates whether the prediction is between an upper and lower boundary of confidence width as also described herein. If not, the prediction is rejected at example operation 308, which results in a not dangling result (example operation 316) due to insufficient confidence of the prediction returned via operation 318.

Returning to example operation 306's evaluation, if the prediction is between the upper and lower boundary of confidence width, operation 310 is performed to interpret the prediction value (the estimated result, and if further needed the prediction confidence for the use case). If (example operation 312) the prediction time/latency value and confidence score do not indicate a dangling resource, (e.g., the estimated prediction time/latency value is below a threshold value), operations 316 and 318 return a not dangling result. Otherwise the estimated prediction time/latency value (with sufficient confidence) satisfy the threshold and operations 314 and 318 return a dangling resource result.

Returning to example operation 208, if the result indicates a dangling resource, example operation 210 takes a deletion action/triggers a deletion of the resource. This can be a notification to an administrator, an automated procedure, and so on. Deletion can be automatic, such as if the estimated prediction time/latency value is relatively high with a high confidence score; note that the predicted value and/or confidence can be returned at operation 206 and evaluated at operation 208 in such a scenario. Deletion can be semi-automatic, e.g., a process can observe a "likely" dangling resource for some time limit, and if the resource is not used before the time expires, deletion takes place. As is understood, other alternatives can be used to perform the actual deletion operation.

In sum, the message broker monitoring service collects different parameters from the message broker at a rate/delay configured by an administrator or the like. After collecting the parameters, message broker monitoring service runs a prediction model to know the current and future resource-related (e.g., dangling/failure) information. Dangling resources can be deleted, such as by triggering some action, such as a sending notification to the administrator.

By way of example, consider the dataset in the table below, comprising historical datasets and new data, which is used to estimate the dangling resource based on the maximum delivery tag, which is predicted/estimated based on the historical data and the collected new data as described herein, where the asterisk '*' indicates the predicted/estimated value, which sums up whether the message was delivered.

|  | Number of Measure Nodes | Message Rates | Publisher Confirms | ACK Latency | Order of Publisher Confirmation | Reaching to Maximum Delivery Tag |
|---|---|---|---|---|---|---|
| Historical Data | 5 | 200 | 0 | 0 | 2 | 2.1 |
| Historical Data | 10 | 250 | 0 | 0 | 5 | 3.5 |
| Historical Data | 2 | 632 | 0 | 0 | 4 | 1.2 |
| Historical Data | 15 | 452 | 0 | 0 | 6 | 2.5 |
| Historical Data | 20 | 129 | 0 | 0 | 8 | 3.4 |
| Historical Data | 21 | 357 | 1 | 0.5 | 2 | 2.1 |
| Historical Data | 3 | 159 | 1 | 0.8 | 3 | 4.2 |
| Historical Data | 5 | 357 | 0 | 0 | 7 | 1.1 |
| New Data | 1 | 234 | 1 | 0.4 | 6 | 4.6* |

Thus, in this example, when the new dataset is obtained to identify a potentially dangling queue, e.g., repeated at a rate/after a delay configurable by an administrator, the parameters include of the number of measure nodes, message rates, publisher confirms, ACK latency, and order of publisher confirmation; these parameters are the known "X" variable set, and the reaching to maximum delivery tag is the unknown Y variable be predicted). The data is input to a regression, which in this example predicts the value of Y as equal to 4.6, which indicates a dangling resource.

More particularly, the technology is based on considering the behavior of the message broker, which gives a collective behavior of the microservices with respect to the messaging services. The needed parameters values can be stored in a suitable data store (e.g., a database) for analysis, with the analysis problem translated into a regression to find the "reaching to maximum delivery tag" time of message delivery from each microservice using the model created, accompanied by the prediction confidence.

Note that the various parameters from a message broker do not follow a linear relationship whereby using simple regression is not particularly adequate. Accordingly and as will be seen, instead conformal quantile regression (CQR) provides suitable results. Indeed, quantile regression is a good choice, as it can be used for any model, for e.g. decision trees. Further, wrapping a learning framework (conformal prediction) on an underlying model complements the prediction with a confidence of the prediction, in variable-width. As another benefit, when a microservice sends relatively large messages, e.g., 2K, the technology described herein is able to provide accurate delivery times, along with that ability to trust that the given forecast is adequately guaranteed using conformal prediction for regression. In contrast, other artificial intelligence machine learning algorithms tends to focus on the prediction result, but ignore the prediction's confidence.

An accurate prediction result with confidence is achieved as described herein using a split-conformal framework, which splits the training data into two disjoint subsets comprising a proper training set and a calibration set. Quantile regression estimates the message delivery time by solving the obtained regression equation, by fitting a regression model on the training samples, with the residuals used on the held-out validation set to quantify the uncertainty in future predictions. In practice this works well even for relatively small datasets, while being less compute intensive and providing better accuracy and confidence of prediction than other techniques.

The following is reasonably optimal with respect to the number of times the model is trained for an incoming dataset. The model can be retrained, such as only when the number of incoming data points are at least equal to the number of microservices in the systems. By way of example for the logic for when to retrain the model, consider that there are x number of data points in historical database.

```
for (i=0; i<= number of microservices in the systems; i++) {
    if (i != number of microservices in the systems) {
        update parameter data in historical database;
        i = i+1;
    }
    else {
        train the model
        i = i+1;
    }
}
```

Applying quantile conformal prediction (split conformal with random forest) provides the result below; the smaller the difference between the upper and lower bound, the better the forecast. The prediction value needs to be between the lower and upper bound, or else that particular prediction is rejected.

The following table shows the (partial) output of conformal quantile regression with confidence:

|  | Predicted Value | Lower Bound | Upper Bound |
|---|---|---|---|
| 0 | 0.250629 | 0.128616 | 0.451536 |
| 1 | 1.545545 | 0.087951 | 1.768281 |
| 2 | 0.918973 | 0.282445 | 1.561392 |
| 3 | 0.041771 | 0.031944 | 0.465235 |
| 4 | 0.668344 | 0.286164 | 1.695699 |
| ... | ... | ... | ... |
| 94 | 0.167086 | 0.035533 | 0.269343 |
| 95 | 0.375943 | 0.182750 | 0.581443 |
| 96 | 0.835430 | 0.138800 | 1.213935 |
| 97 | 0.501258 | 0.268118 | 1.539276 |
| 98 | 0.543029 | 0.055078 | 0.872908 |

Experiments on the dataset using four different techniques help understand the prediction performance and the width of the confidence of prediction. As can be seen from the below table, ensemble tress with symmetric conformal quantile regression (CQR) provided the best prediction of these four, e.g., as compared to conformal neural network:

|  | Percentage in the range | Average length |
|---|---|---|
| Symmetric CQR* | 91.228070 | 1.354486 |
| Asymmetric CQR | 90.476190 | 1.479800 |
| CQR Rearrangement | 90.225564 | 1.554184 |
| Neural Net |  |  |
| CQR Neural Net | 90.726817 | 1.539096 |

Figure 4:
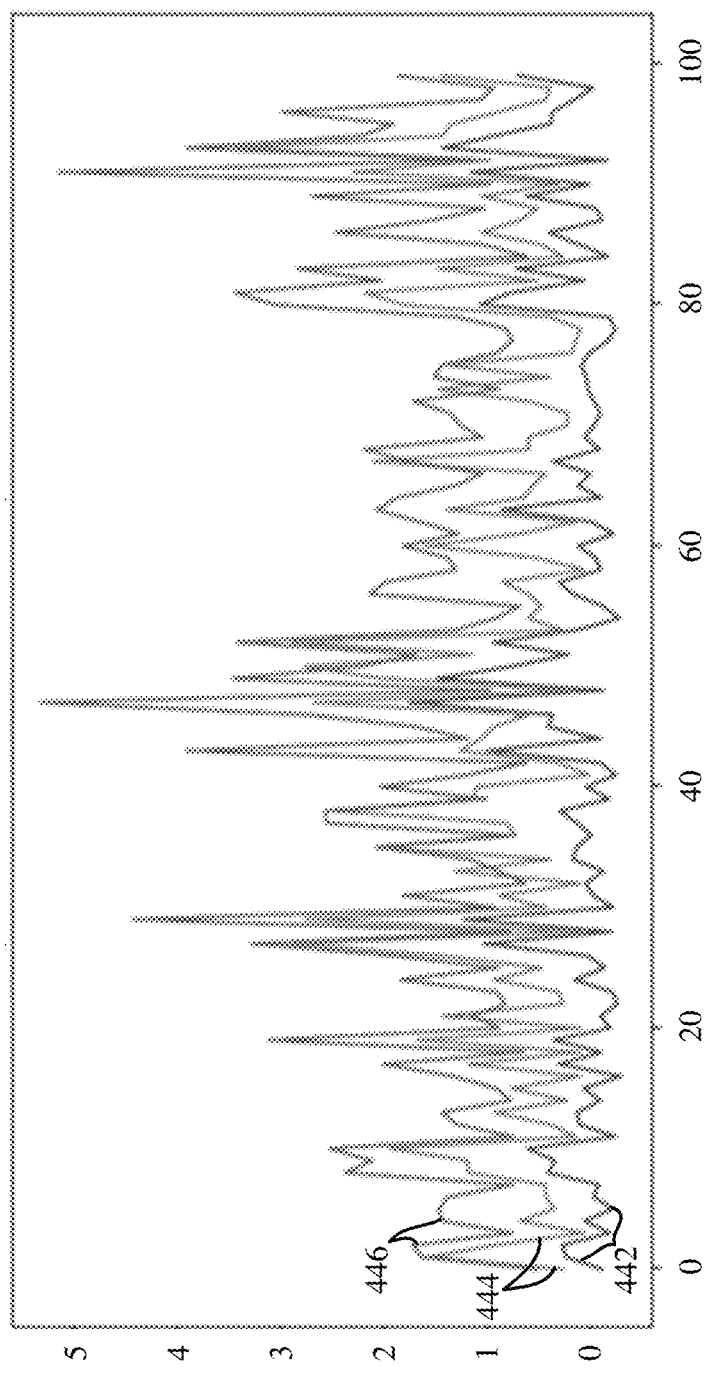
FIG. 4 is an example graph representing symmetric non-conformity score results for symmetric conformal quantile regression (CQR) with confidence bound, in accordance with various aspects and implementations of the subject disclosure.
Figure 5:
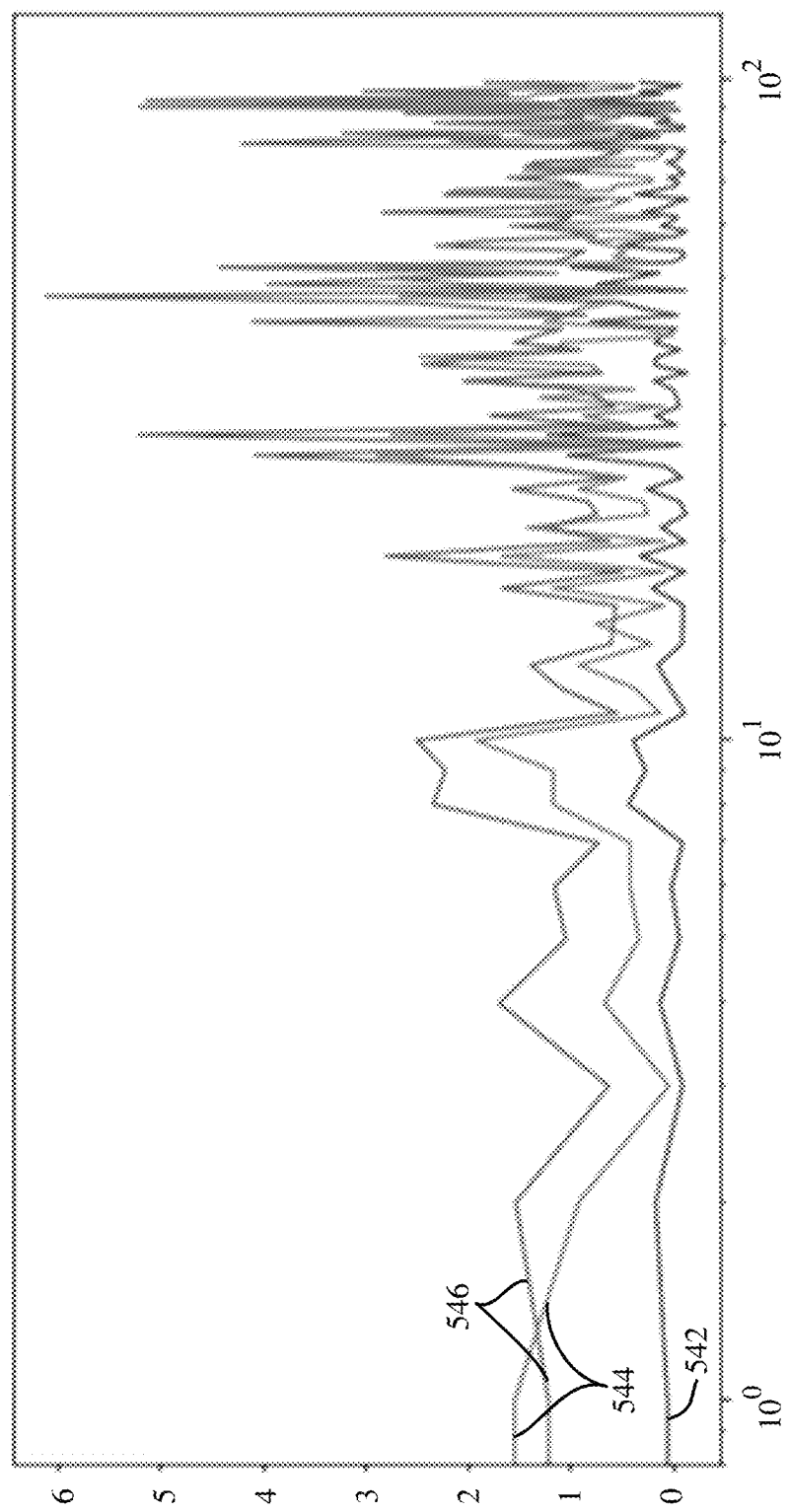
FIG. 5 is an example graph representing results obtained via a CQR rearrangement neural net for symmetric conformal quantile neural network with confidence bound, in accordance with various aspects and implementations of the subject disclosure.

FIG. 4 shows symmetric nonconformity results of symmetric conformal quantile regression with confidence bound, where line 442 indicates the lower bound, line 444 indicates the actual value, and line 446 indicates the upper bound. In contrast, FIG. 5 shows CQR rearrangement neural net results of symmetric conformal quantile regression with confidence bound, where line 552 indicates the lower bound, line 554 indicates the actual value, and line 556 indicates the upper bound.

Figure 6:
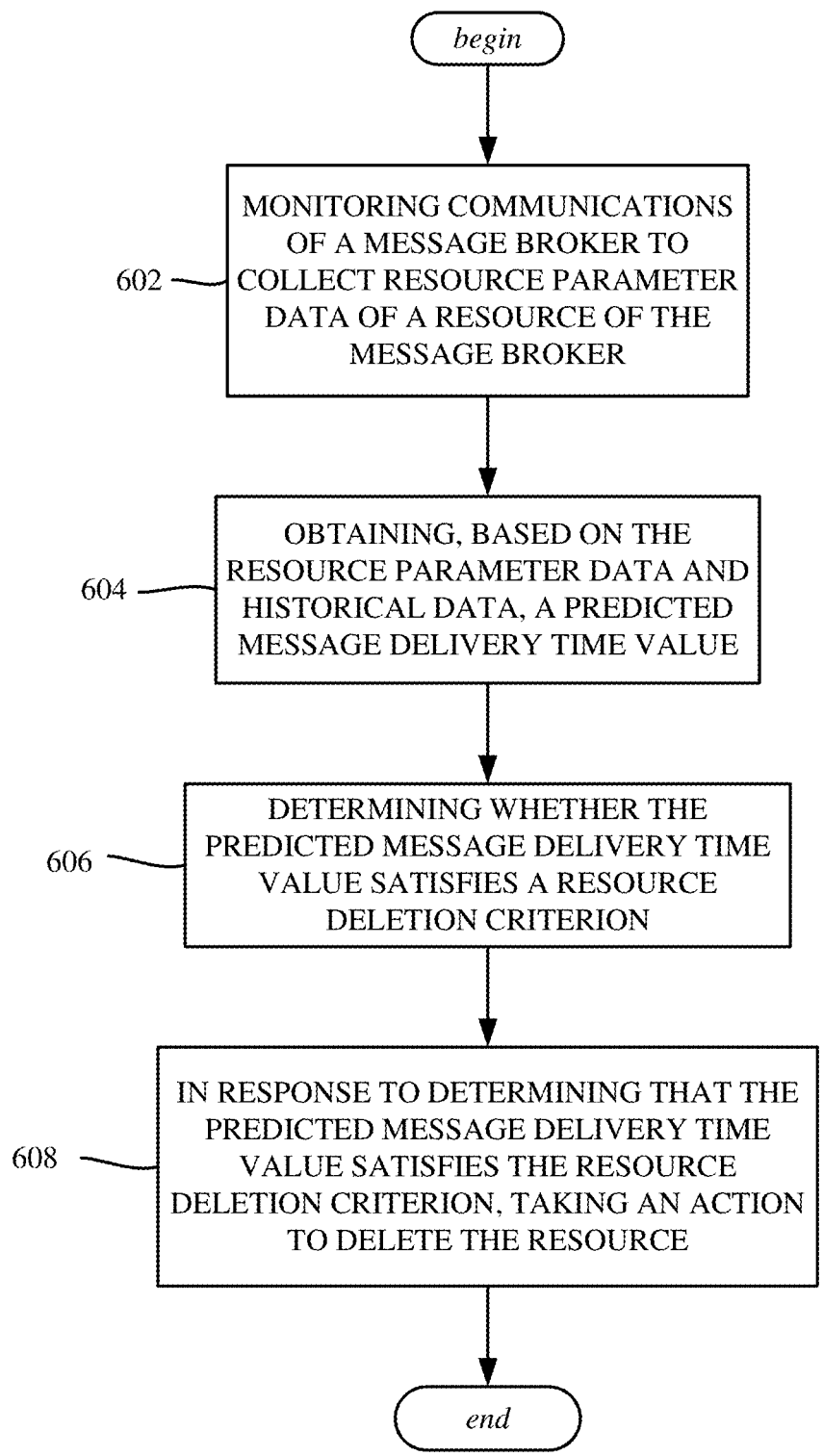
FIG. 6 is a flow diagram representing example operations related to monitoring communications of a message broker to determine whether a predicted message delivery time value satisfies a resource deletion criterion, in accordance with various aspects and embodiments of the subject disclosure.

One or more aspects can be embodied in a system, such as represented in FIG. 6, and for example can comprise a memory that stores computer executable components and/or operations, and a processor that executes computer executable components and/or operations stored in the memory. Example operations can comprise operation 602, which represents monitoring communications of a message broker to collect resource parameter data of a resource of the message broker. Operation 604 represents obtaining, based on the resource parameter data and historical data, a predicted message delivery time value. Operation 606 represents determining whether the predicted message delivery time value satisfies a resource deletion criterion. Operation 608 represents in response to determining that the predicted message delivery time value satisfies the resource deletion criterion, taking an action to delete the resource.

The resource can comprise a queue of the message broker.

The resource can comprise at least one of: a socket, memory space, a file handler, disk space, an open connection, or a channel used by the message broker.

The message broker can be coupled to a microservice to handle communications of the microservice.

Further operations can comprise sending heartbeats to the message broker for connection confirmations.

The resource parameter data can comprise at least one of: measure node data, message rate data, publisher confirmation data, acknowledgement time data, or order of publisher confirmation data.

The resource parameter data can comprise at least one of: connection data or queue data.

Obtaining the predicted message delivery time value can comprise applying a regression to estimate the predicted message delivery time value. The regression can comprise symmetric conformal quantile regression. The regression can comprise at least one of: symmetric conformal quantile regression, asymmetric conformal quantile regression, neural network conformal quantile regression, or rearrangement conformal quantile regression.

The resource deletion criterion can comprise a threshold value.

The resource deletion criterion can comprise a threshold value and a confidence score. The confidence score can be between an upper and lower confidence bound.

Taking the action to delete the resource can comprise outputting a notification.

Obtaining resource parameter data can be based on user-configurable time data.

Figure 7:
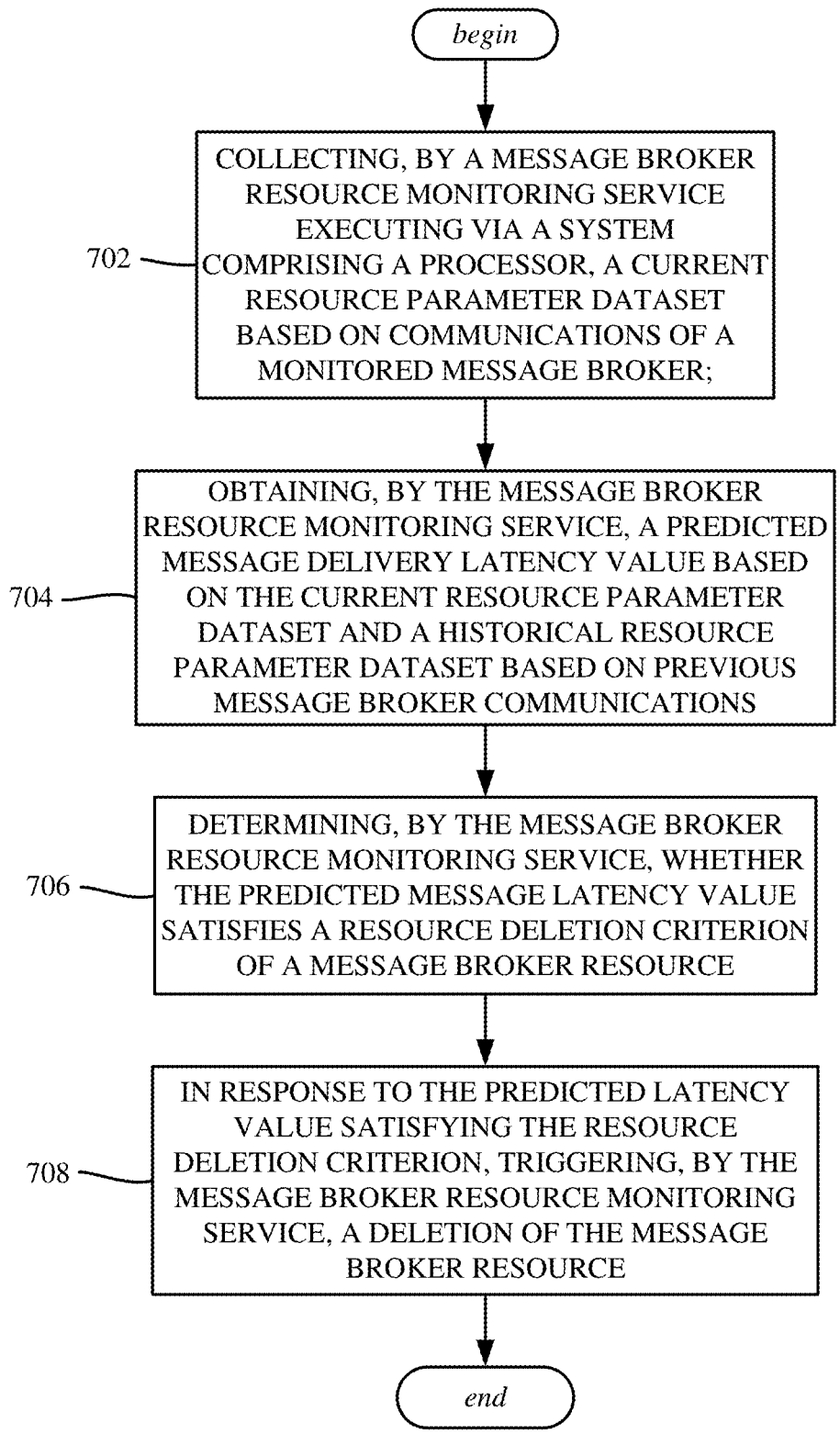
FIG. 7 is a flow diagram representing example operations related to determining whether a predicted message latency value satisfies a resource deletion criterion of a message broker resource, in accordance with various aspects and embodiments of the subject disclosure.

One or more example aspects, such as corresponding to operations of a method, are represented in FIG. 7. Operation 702 represents collecting, by a message broker resource monitoring service executing via a system comprising a processor, a current resource parameter dataset based on communications of a monitored message broker. Operation 704 represents obtaining, by the message broker resource monitoring service, a predicted message delivery latency value based on the current resource parameter dataset and a historical resource parameter dataset based on previous message broker communications. Operation 706 represents determining, by the message broker resource monitoring service, whether the predicted message latency value satisfies a resource deletion criterion of a message broker resource. Operation 708 represents, in response to the predicted latency value satisfying the resource deletion criterion, triggering, by the message broker resource monitoring service, a deletion of the message broker resource.

The resource deletion criterion can comprise a criterion based on a threshold message delivery latency value, and obtaining the predicted message delivery latency value can comprise applying a regression technique to estimate the predicted latency value.

The resource deletion criterion can comprise a threshold message delivery latency value and first confidence data, and the predicted latency value can be associated with estimated confidence data.

Figure 8:
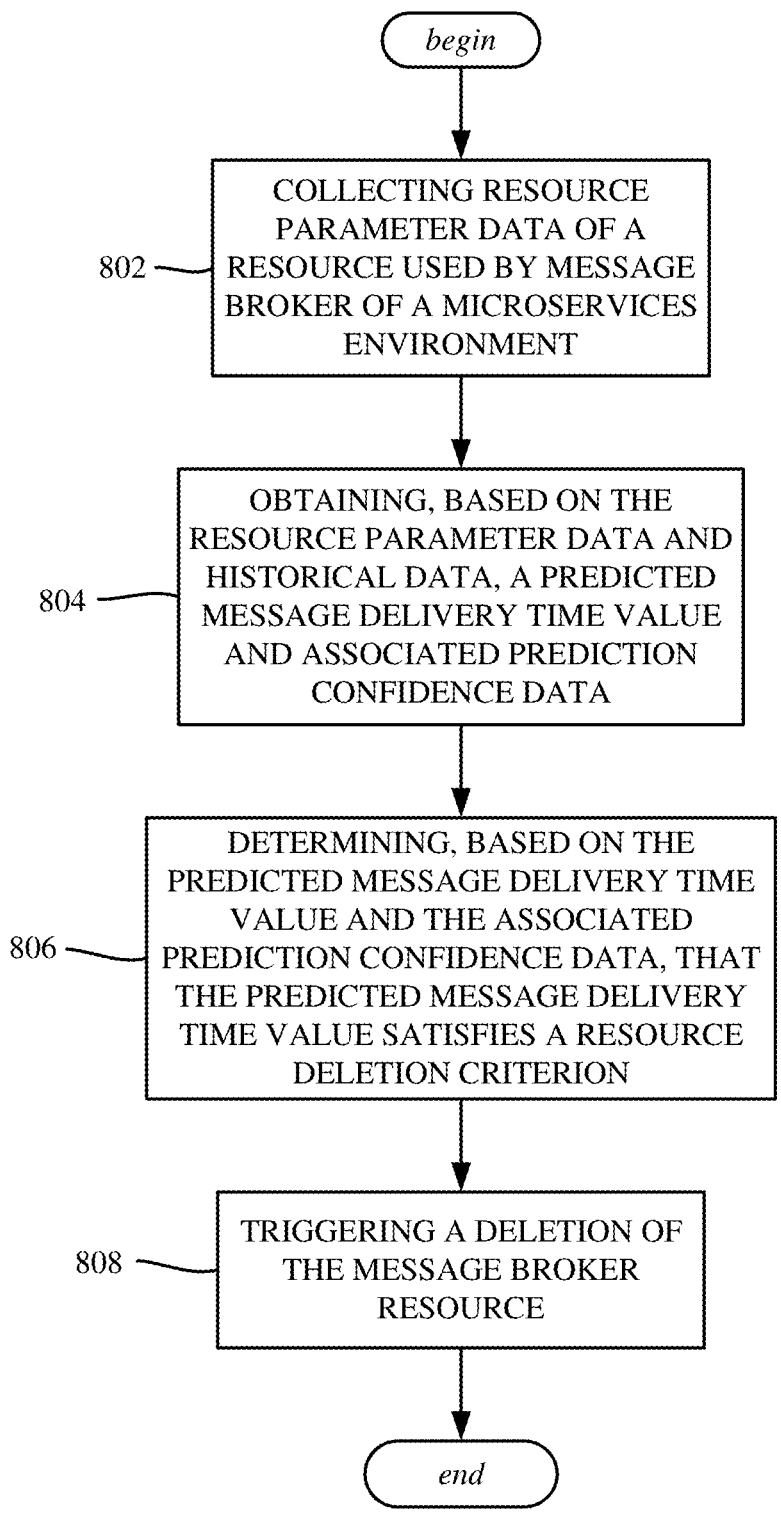
FIG. 8 is a flow diagram representing example operations related to triggering a deletion of a message broker resource upon determining that a predicted message delivery time value satisfies a resource deletion criterion, in accordance with various aspects and embodiments of the subject disclosure.

FIG. 8 summarizes various example operations, e.g., corresponding to a machine-readable storage medium, comprising executable instructions that, when executed by a processor, facilitate performance of operations. Operation 802 represents collecting resource parameter data of a resource used by message broker of a microservices environment. Operation 804 represents obtaining, based on the resource parameter data and historical data, a predicted message delivery time value and associated prediction confidence data. Operation 806 represents determining, based on the predicted message delivery time value and the associated prediction confidence data, that the predicted message delivery time value satisfies a resource deletion criterion. Operation 808 represents triggering a deletion of the message broker resource.

Obtaining the predicted message delivery time value and the associated prediction confidence data can comprise applying a regression technique based on the resource parameter data and the historical data.

As can be seen, the technology described herein facilitates message broker resource (e.g., queue) clean-up, such as when a service is finished performing its work or accidently crashed. The technology described herein provides run time analysis of a message broker, which also can be used for current and future microservice failure prediction, e.g., via a learning algorithm to ensure a message broker is alive and well-functioning. In one aspect, the calibration prediction interval, which can be variable-width, uses conditional quantile regression, is adaptive to heteroscedasticity, and is without a restriction for split conformal data.

Figure 9:
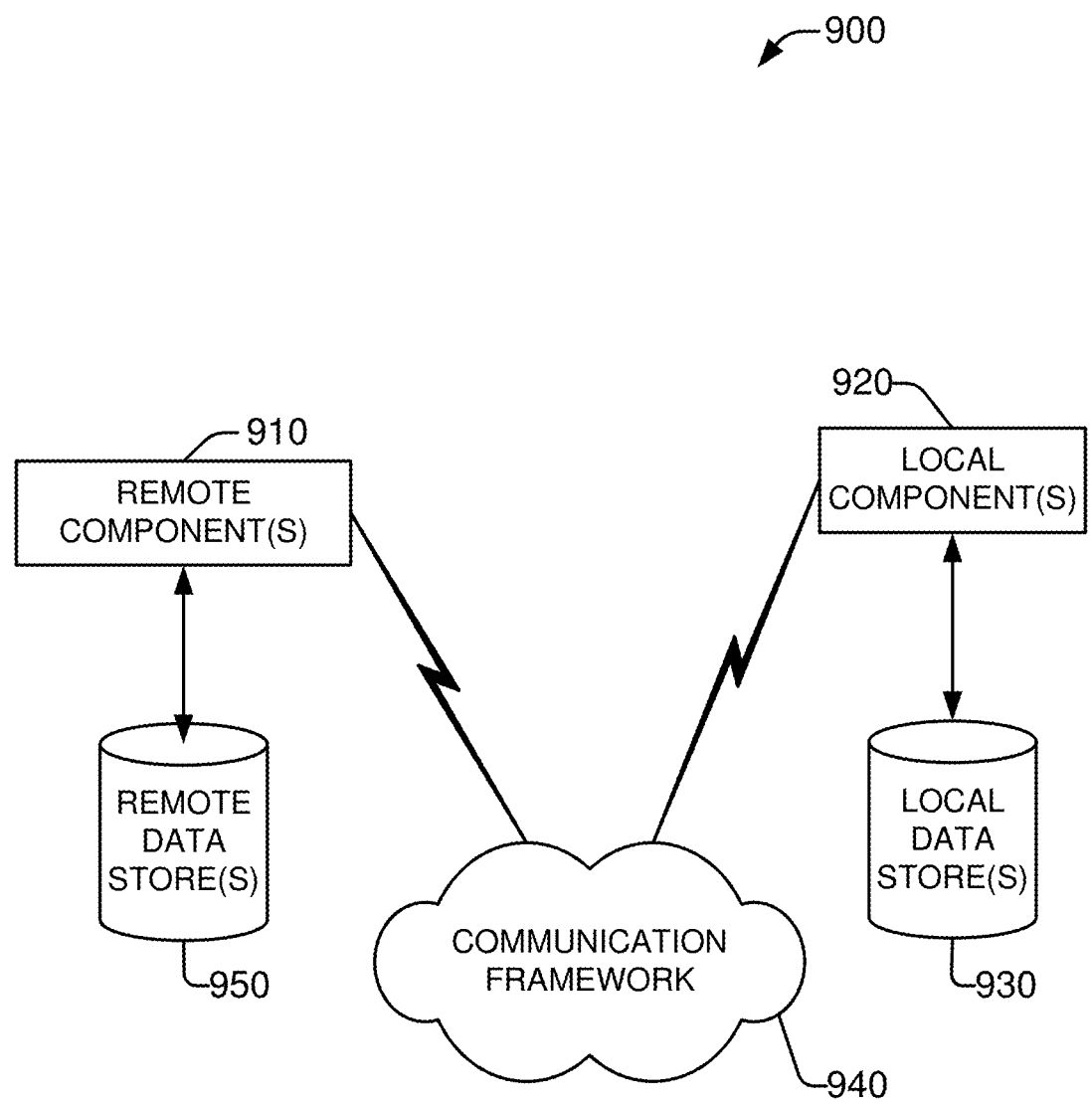
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
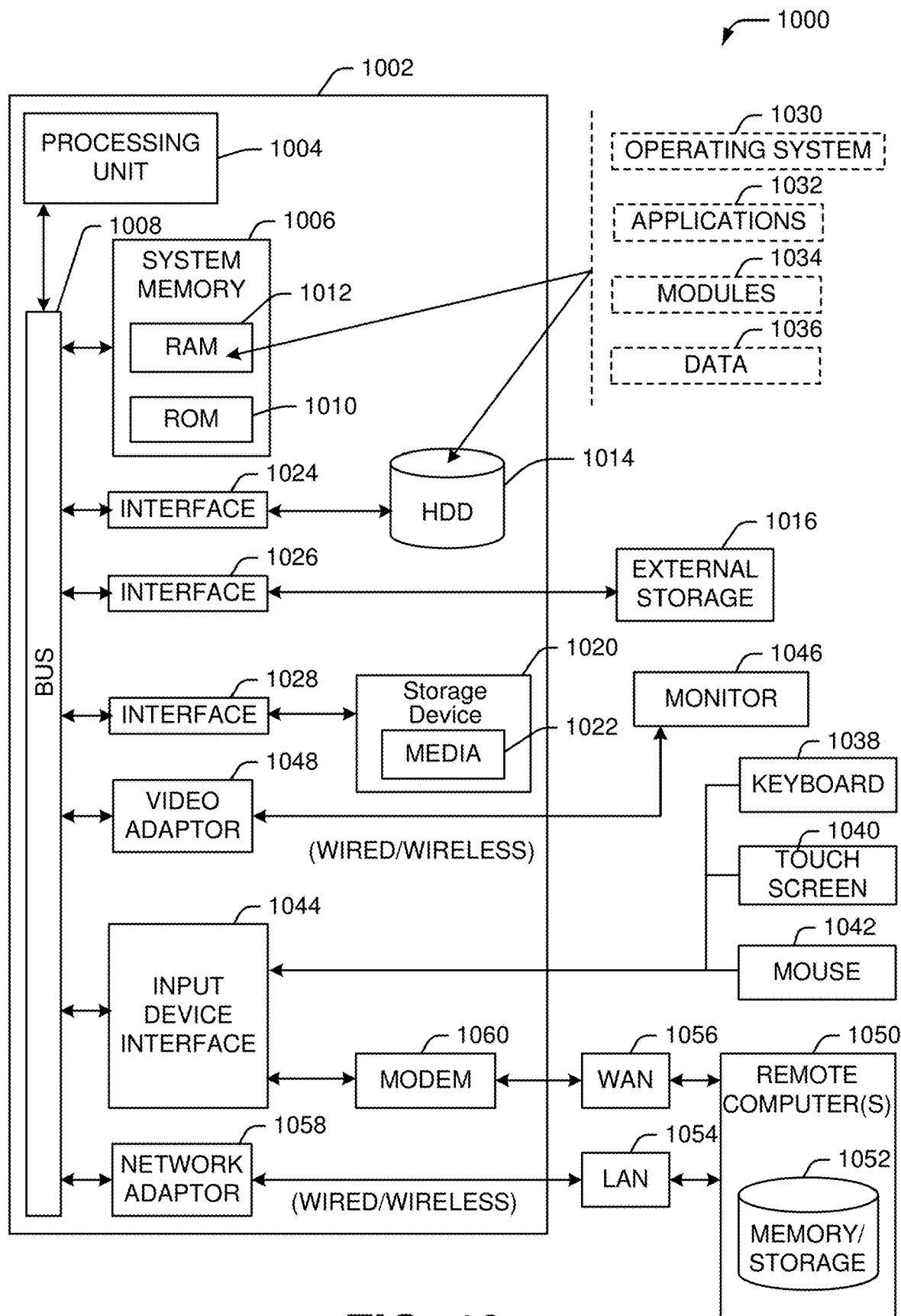
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   monitoring communications of a message broker to collect resource parameter data of a resource of the message broker, wherein a behavior of the message broker is representative of a collective behavior of one or more microservices associated with the message broker;

obtaining, based on the resource parameter data of the resource of the message broker and historical data, a predicted message delivery time value;

determining whether the predicted message delivery time value satisfies a resource deletion criterion;

in response to determining that the predicted message delivery time value satisfies the resource deletion criterion, taking an action to delete the resource, wherein deletion of the resource is semi-automatic, resulting in the resource being deleted based on the resource not being utilized within a defined time interval; and training a regression model used to obtain the predicted message delivery time value based on a number of incoming data points being determined to be equal to a number of the one or more microservices associated with the message broker, wherein a regression technique applied to obtain the predicted message delivery time value comprises symmetric conformal quantile regression.

2. The system of claim 1, wherein the resource comprises a queue of the message broker.

3. The system of claim 1, wherein the resource comprises at least one of: a socket, memory space, a file handler, disk space, an open connection, or a channel used by the message broker.

4. The system of claim 1, wherein the message broker is coupled to a microservice to handle communications of the microservice.

5. The system of claim 1, wherein the operations further comprise sending heartbeats to the message broker for connection confirmations.

6. The system of claim 1, wherein the resource parameter data comprises at least one of: measure node data, message rate data, publisher confirmation data, acknowledgement time data, or order of publisher confirmation data.

7. The system of claim 1, wherein the resource parameter data comprises at least one of: connection data or queue data.

8. The system of claim 1, wherein the resource deletion criterion comprises a threshold value.

9. The system of claim 1, wherein the resource deletion criterion comprises a threshold value and a confidence score.

10. The system of claim 9, wherein the confidence score is between an upper and a lower confidence bound.

11. The system of claim 1, wherein the taking the action to delete the resource comprises outputting a notification.

12. The system of claim 1, wherein obtaining the resource parameter data of the resource of the message broker is based on user-configurable time data.

13. A method, comprising:

collecting, by a message broker resource monitoring service executing via a system comprising a processor, a current resource parameter dataset based on communications of a monitored message broker, wherein a behavior of the monitored message broker is representative of a collective behavior of one or more microservices associated with the monitored message broker;

obtaining, by the message broker resource monitoring service, a predicted message delivery latency value based on the current resource parameter dataset and a historical resource parameter dataset based on previous message broker communications;

determining, by the message broker resource monitoring service, whether the predicted message delivery latency value satisfies a resource deletion criterion of a message broker resource;

in response to the predicted message delivery latency value satisfying the resource deletion criterion, triggering, by the message broker resource monitoring service, a deletion of the message broker resource, wherein the deletion is semi-automatic, resulting in the message broker resource being deleted based on the message broker resource not being utilized before expiration of a defined time limit; and in response to a number of incoming data points being determined to be equal to a number of the one or more microservices associated with the monitored message broker, training a regression model used to obtain the predicted message delivery latency value, wherein a regression technique applied to obtain the predicted message delivery time value comprises symmetric conformal quantile regression.

14. The method of claim 13, wherein the resource deletion criterion comprises a criterion based on a threshold message delivery latency value, and wherein the regression technique estimates the predicted message delivery latency value.

15. The method of claim 13, wherein the resource deletion criterion comprises a threshold message delivery latency value and first confidence data, and wherein the predicted message delivery latency value is associated with estimated confidence data.

16. A non-transitory machine-readable medium, comprising executable instructions that, when executed by a processor, facilitate performance of operations, the operations comprising:

collecting resource parameter data of a resource used by message broker of a microservices environment, wherein a behavior of the message broker is representative of a collective behavior of one or more microservices in the microservices environment;

obtaining, based on the resource parameter data and historical data, a predicted message delivery time value and associated prediction confidence data;

determining, based on the predicted message delivery time value and the associated prediction confidence data, that the predicted message delivery time value satisfies a resource deletion criterion;

triggering a deletion of a message broker resource, wherein the deletion is automatic or semi-automatic, and wherein a semi-automatic deletion results in the message broker resource being deleted based on the message broker resource not being utilized within a defined time interval; and in response to a number of incoming data points being determined to be equal to a number of the one or more microservices associated with the message broker, training a regression model usable to obtain the predicted message delivery time value, wherein a regression technique applied to obtain the predicted message delivery time value comprises symmetric conformal quantile regression.

17. The non-transitory machine-readable medium of claim 16, wherein the obtaining the predicted message delivery time value and the associated prediction confidence data comprises applying the regression technique based on the resource parameter data and the historical data.

18. The non-transitory machine-readable medium of claim 16, wherein the resource parameter data comprises at least one of: measure node data, message rate data, publisher confirmation data, acknowledgement time data, or order of publisher confirmation data.

19. The non-transitory machine-readable medium of claim 16, wherein the resource parameter data comprises at least one of: connection data or queue data.

20. The non-transitory machine-readable medium of claim 16, wherein the resource deletion criterion comprises a threshold value and a confidence score.

* * * * *